United States Patent [19]
Schreuder

[11] 3,750,231
[45] Aug. 7, 1973

[54] POULTRY PROCESSING IMPROVEMENT
[75] Inventor: Thomas R. Schreuder, South Holland, Ill.
[73] Assignee: Swift & Company, Chicago, Ill.
[22] Filed: Oct. 12, 1971
[21] Appl. No.: 188,304

[52] U.S. Cl. ................................................. 17/11
[51] Int. Cl. ............................................ A22b 3/08
[58] Field of Search ........................................ 17/11

[56] References Cited
UNITED STATES PATENTS
3,555,593   1/1971   Scheier .................................. 17/11
3,451,097   6/1969   Knight .................................... 17/11

Primary Examiner—Robert Peshock
Attorney—Edward T. McCabe et al.

[57] ABSTRACT

A method and apparatus for automatically cutting the neck and clearing the body cavity of a partially eviscerated poultry carcass wherein the positions of the stern and neck of of the carcass are detected and engaged against displacement and thereafter the neck is cut and a vacuum nozzle is reciprocated within the body cavity.

12 Claims, 6 Drawing Figures

PATENTED AUG 7 1973

INVENTOR
THOMAS R. SCHREUDER

E.D. McCabe
ATTORNEY

Fig. 2

INVENTOR
THOMAS R. SCHREUDER

ATTORNEY

Fig. 6

POULTRY PROCESSING IMPROVEMENT

The present invention pertains to the art of poultry processing; and more specifically is directed to an improved method and apparatus for automatically cutting the neck of a poultry carcass and clearing debris and/or organs from the interior of the body cavity.

The poultry processing industry has experienced large growth during the past two decades and many processes and apparatus have been devised for reducing the amount of hand labor required in slaughtering and preparing birds for market. However, prior developments pertaining to the evisceration, trimming and internal clearing of the carcasses have generally required manual handling of the carcass with respect to the tool, as with the placing of a carcass on an automatic knife apparatus; or conversely has required the manual handling of a tool for treating the carcass, such as a hand-manipulated vacuum nozzle for clearing the body cavity of the bird. Also, the carcasses are expeditiously carried on shackles supported by a continuously moving conveyor and it has been necessary with some of these operations for operators to remove the carcasses from the shackles and then return them after processing. Therefore, great advantage would accrue to developments in the art which further reduce the hand manipulation and provide for automatic handling of the carcasses.

Accordingly, it is a principal object of the present invention to provide an improved method and apparatus for automatically sensing the position of a carcass and cutting the neck of the same.

It is another object of the present invention to provide an improved method and apparatus to automatically direct a carcass and appropriately position a vacuum tool to clear the body cavity of the same.

Still another object is to provide an improved method and apparatus for substantially automatically and simultaneously detecting and engaging the carcass and positioning the tools for automatically and simultaneously cutting the neck and clearing the body cavity thereof.

Yet another object of the present invention is to provide an improved method and apparatus which is automatically adapted to the specific size of a given carcass.

An even further object of the present invention is to provide an improved method and apparatus to estimate and locate the position of a selected anatomical feature of a carcass and to thereby control the clearing of the body cavity.

It is a still further object of the present invention to provide an improved method and apparatus for detecting a carcass and to both cut the neck and vacuum the cavity thereof while the carcass is continuously moving on a conveyor shackle.

Basically, the method of the present invention is applicable to a poultry carcass that has been paritally eviscerated and processed, at least to the extent that an incision has been made in the posterior thereof to provide access to the body cavity, and the carcass is suspended from a shackle by the legs with the neck disposed downwardly. Each carcass is thus held and the positions of the carcass shoulder (in this description the carcass shoulder will mean the forward area of the carcass where the neck joins the body) and the stern of the carcass are detected and the respective tools are brought into position. Thereafter the neck vertebra and muscle tissue of the carcass is cut at a point closely spaced below the carcass shoulder, preferably without severing the esophagus; and substantially simultaneously a vacuum nozzle tool is lowered into the body cavity through the posterior incision; and the vacuum nozzle is reciprocated downwardly to about the crop area of the carcass and upwardly at least to about the selected anatomical feature (usually the kidney area) with a vacuum applied to the carcass during at least the upward movement of the tool.

An apparatus devised for performing the above method comprises a frame, movable with the shackle conveyor, upon which carcass sensor means are carried. The carcass sensor means comprise two movable parts to detect the shoulders and stern of a poultry carcass therebetween. Neck cutting means are associated with one of the sensor means parts, and a vacuum tool is associated with the other sensor part and is independently reciprocable thereof.

Further objects and advantages of the present invention will become clear upon reading the following detailed description in conjunction with the drawings wherein.

Before undertaking the present method the carcass should be at least partially eviscerated to the extent that an incision is made in the posterior of the bird and preferably the major entrails that are normally discarded are removed. The poultry carcass is held suspended from a shackle wherein the legs of the carcass are secured and the body is disposed neck downwardly. The shackle and carcass may be moved throughout the following procedure.

According to the preferred method both the carcass shoulder and stern (posterior) are simultaneously detected with separate sensing members, and concomitantly means are positioned to cut the neck and vacuum the body cavity. Preferably the neck of the carcass is held firmly and engaged against displacement other than the normal movement imparted thereto by travel of the conveyor and shackle. The approximate position of a selected anatomical feature, preferably the kidney position in the body cavity, is then estimated and a trip or signal mechanism is located externally of the carcass at this position. In practice it has been found that the kidney position will generally be located approximately one-third of the distance between the shoulders and stern as measured below the stern of the carcass; and the portion of the space in the body cavity forward (toward the shoulders) of this position denotes an area that requires maximum attention for clearing by vacuum or the like.

Thereafter a suitable tool such as a vacuum nozzle is inserted within the carcass cavity through the incision in the posterior, and the tool is lowered to the forward extremity of the cavity toward the shoulders of the carcass. When the tool reaches the latter position it is then pivoted to bring the nozzle face into contact with the back of the cavity and the nozzle is communicated to a vacuum source to cause evacuation of the cavity. Thereafter the vacuum tool is raised while remaining in communication with the source of vacuum.

Substantially simultaneously, and while the carcass remains held against displacement, the neck is partially severed from the body by passing a knife edge along a plane just below the point at which the neck is engaged to retain the carcass against displacement. Preferably, the esophagus is not severed, but only the vertebra and part of the muscle and skin are cut.

Preferably, the vacuum tool is reciprocated several times between the forward extremity of the body cavity and the position of the selected anatomical feature such as the kidney position. While being so reciprocated and at least on the upward stroke, the tool is also preferably rotated alternately from side to side so as to sweep across the width of the body cavity. Thereafter the vacuum tool is completely withdrawn from the body cavity and the shoulders and/or neck stub released and the procedure is repeated with a successive carcass.

A preferred apparatus devised for performing the foregoing method may be seen in the FIGURES. The present invention was devised to automatically operate upon poultry carcasses generally 10 which are hung neck downwardly by engaging the hooks or legs of the carcass in shackles generally 11 which are, in turn, suspended from an overhead conveyor generally 12. The shackles 11 are positioned accurately by spaced blocks 16 in an endless chain 17 that is driven in the direction of product flow along conveyor 12 and is located opposite the operating means hereinafter described. The spaced blocks 16 evenly space the shackles 11 for properly receiving the carcasses 10 in the operating means.

The apparatus of the present invention is mounted upon a movable frame means generally 20, which is reciprocable upon horizontal tracks 21. A bow-shaped bracket 22 is secured generally vertically to the movable frame means 20 and supports a pair of parallel inclined guide rods 23, 24. A power means (not shown) is connected to the movable frame means generally 20 to move it in synchronism with pairs of spaced blocks 16 on the endless chain 17 and hence with the shackles 11 on the endless conveyor generally 12, and to quickly return same to its original starting position after reaching its end of travel.

A single assembly of apparatus is hereinafter described, but it is to be understood that a plurality of brackets 22 and the following described assembly of apparatus of the present invention may be mounted upon a single movable frame generally 20 to enable simultaneous processing of a plurality of carcasses.

The present device includes a lower sensing and positioning means generally 30 mounted upon a lower subframe 31 which is mounted for reciprocation upon the guide rods 23, 24 and is movable by a lower power cylinder 32 fastened to the bowshaped bracket 22; and an upper sensing and positioning means generally 35 which is mounted in a first upper subframe 36 similarly reciprocable on the guide rods 23, 24 and movable by an upper power cylinder 37, also secured to the bow-shaped bracket 22.

The upper sensing and positioning means generally 35 also includes a second upper subframe 38 that will be subsequently described.

Figure 3:
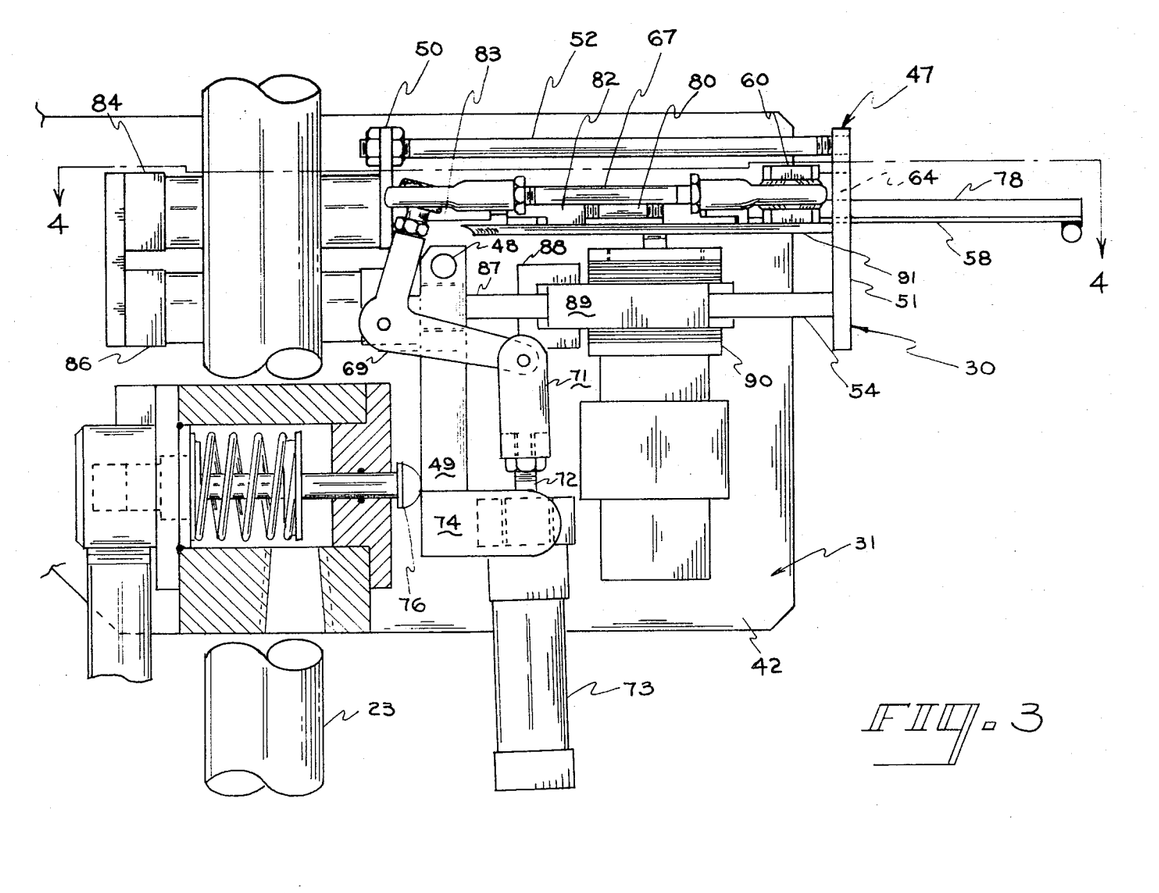
FIG. 3 is a detailed side elevation, also with parts removed, of the lower portion of the apparatus shown in FIG. 2.
Figure 4:
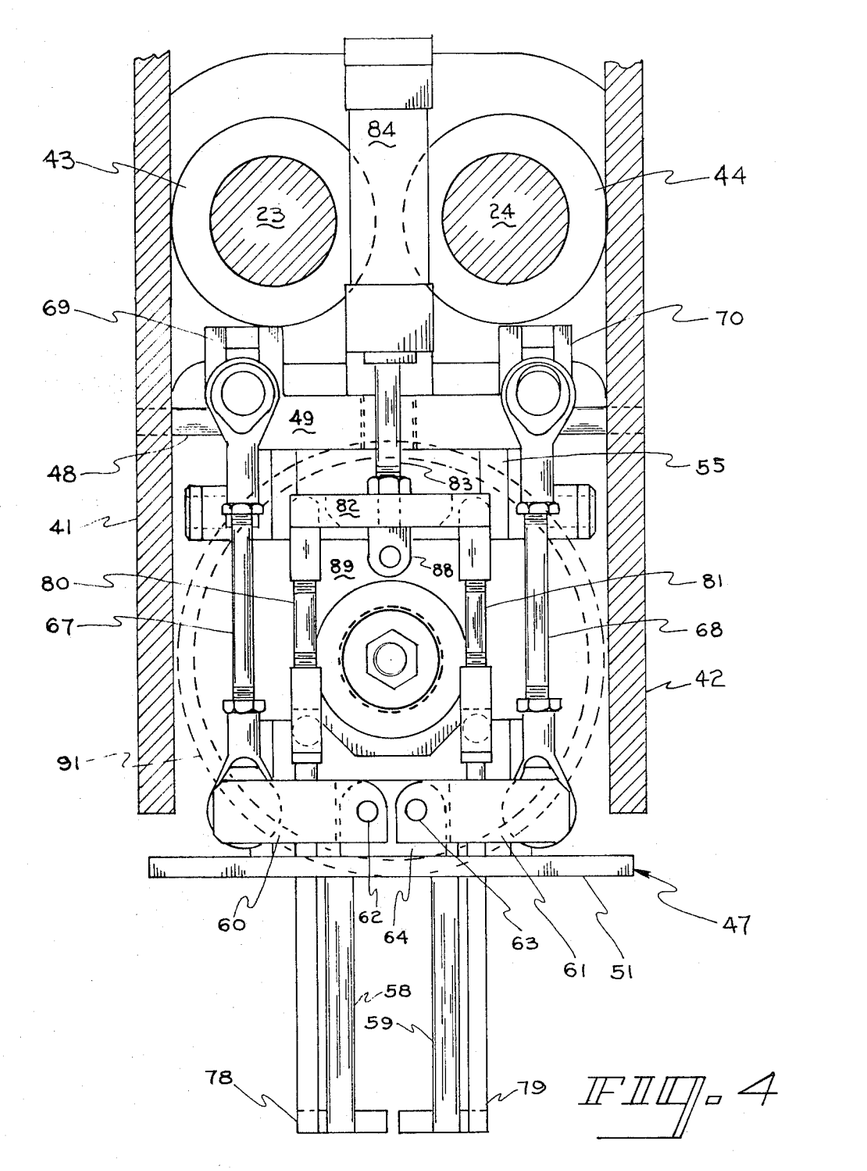
FIG. 4 is a plan view of that portion of the apparatus shown in FIG. 3, with certain parts removed for clarity.
Figure 5:
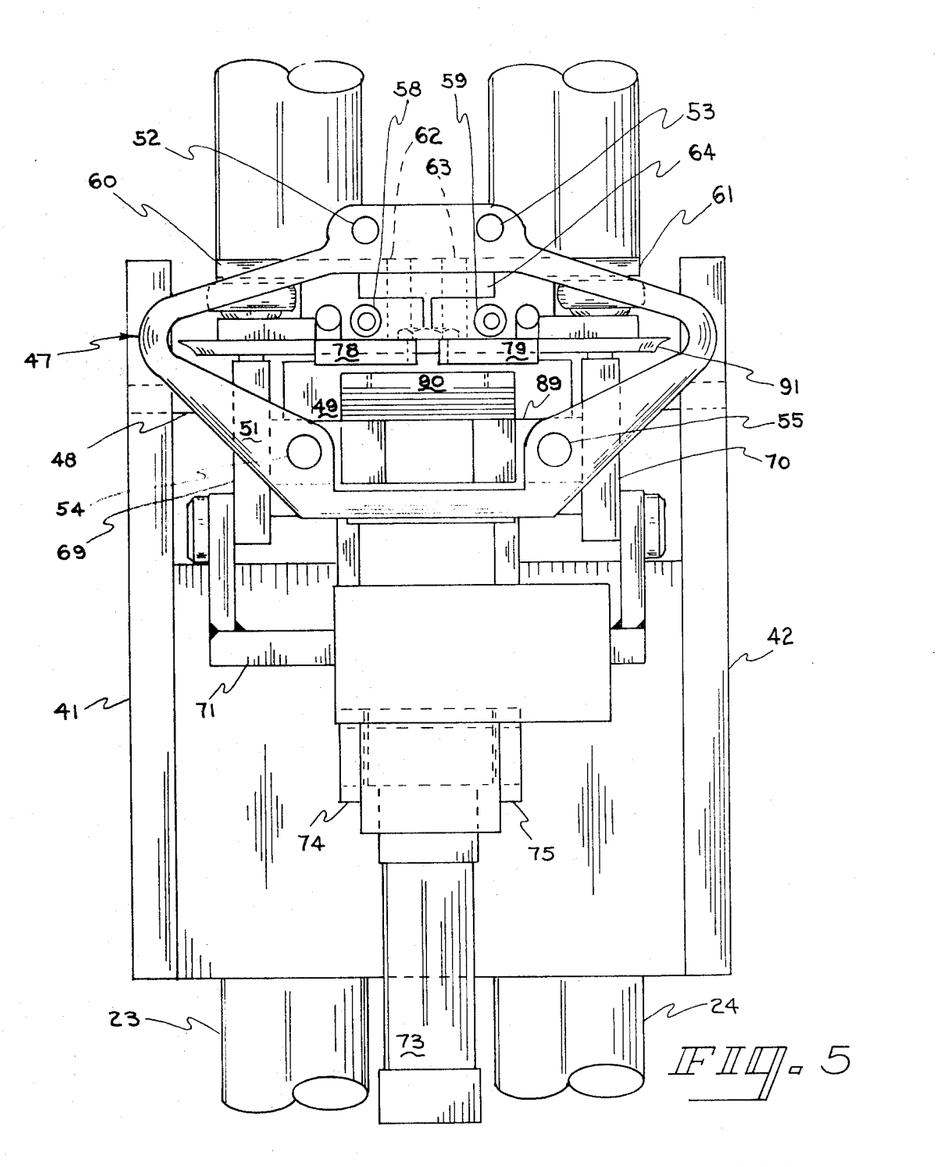
FIG. 5 is a detailed front elevation, with parts removed for clarity, of that portion of the apparatus shown in FIG. 3.

The details of the lower sensing and positioning means generally 30 are best seen in FIGS. 3, 4 and 5. Lower subframe 31 supports forwardly extending sideplates 41, 42, and the subframe itself contains bearings 43, 44, which are slidably mounted on the parallel guide rods 23, 24, respectively. A pivotable inner frame generally 47 is supported from a single pivot shaft 48 that is journaled in the sideplates 41, 42. A vertical bar 49 is secured to the pivot shaft 48 and supports, rearwardly offset, a vertically extending rear-mounting bracket 50 and secured thereto by a pair of upper tie bolts 52, 53, and a pair of motor mount guide rods 54, 55, is a forward frame rim 51.

Sensor engaging fingers 58, 59 extend forwardly of the forward frame rim 51 from a pair of pivot links 60, 61, respectively, to which they are fixed as by welding or the like. Preferably, the engaging fingers 58, 59 include rotatable sleeves to facilitate movement along the neck of a carcass. The pivot links 60, 61 extend oppositely from individual pivot pins 62, 63, respectively, which are in turn mounted on a small flange 64, extending rearwardly from the upper portion of the forward rim 51. Each of the pivot links 60, 61 is bifurcated at each end thereof. At the inner ends the bifurcations overlap the pivot mounting flange 64. At the outer ends of pivot links 60, 61 the bifurcations accept pivotal couplings of a pair of connecting rods 67, 68, respectively. The opposite ends of the connecting rods 67, 68 are also pivotally connected to upper ends of respective rocker arms 69, 70. Each of the rocker arms is comprised of a substantially right angle casting and each is pivotally mounted on rearward extensions of the previously described vertical bar 49 (which is pivotally suspended from the frame sideplates 41, 42 by means of the pivot shaft 48). The lower ends of rocker arms 69, 70, are, in turn, connected to a single yoke 71, which is vertically reciprocable by a piston rod 72 extending from a first actuating cylinder 73 which is secured to the vertical bar 49 by a pair of mounting brackets 74, 75. Thus, it may be observed that as the piston rod 72 is extended and withdrawn from the actuating cylinder 73, the rocker arms 69, 70 will be pivoted to move the connecting rods 67, 68, thereby pivoting the pivot links 60, 61 so as to cause the sensor engaging fingers 58, 59 to diverge (upon upper movement of the yoke 71) and converge, or assume parallel positions (on downward movement of the yoke 71).

Thus, when the apparatus is to receive a carcass 10 the piston rod 72 will be extended upwardly so as to diverge the sensor engaging fingers 58, 59, thereby facilitating reception of the neck of the carcass therebetween. When the carcass is received the sensor engaging fingers 58, 59 will be converged by retracting the piston rod 72; and the apparatus will be initiated to cause the power cylinder 32 to raise the lower subframe 31 until the sensor engaging fingers 58, 59 engage the shoulders of the carcass, whereby the entire inner pivotable frame generally 47 will be caused to pivot slightly on the pivot shaft 48. When this occurs rearward movement of the depending vertical bar 49 will cause displacement of a first trip valve or trip switch 76 fastened within the lower subframe 31. At this point the apparatus is in condition to partially sever the neck from the carcass of the bird and that function is also readied by actuation of the first trip valve 76 at the same time that the latter terminates lifting movement of the power cylinder 32. However actual cutting of the neck may be delayed until the movable frame 20 nears the end of its travel.

A pair of reciprocable dogs 78, 79 are extendable parallel to the sensor engaging fingers 58, 59. The reciprocable dogs 78, 79, are journaled in the respective pivot links 60, 61 slightly outboard of the respective sensor engaging fingers 58, 59. Each reciprocable dog is pivotally attached to one end of a respective connecting rod 80, 81, (see in FIG. 4), each of which is in turn also pivotally connected to a crossbar 82. The crossbar 82 is secured to an end of a piston rod 83 which is horizontally extendable from a second actuating cylinder 84 which is secured to the rear bracket 50 of the inner pivotable frame generally 47. The double pivot connection between the reciprocal dogs 78, 79, connecting rods 80, 81 and the crossbar 82 allows for the reciprocable dogs to remain parallel with each respective sensor engaging finger 58, 59 while the latter are converged and diverged.

A third actuating cylinder 86 is mounted rearwardly near the rear bracket 50 just below the second actuating cylinder 84. Similarly, a horizontally reciprocable piston rod (not visible in the drawings) extends from the third actuating cylinder 86 and is connected by a clevis 88 to a slideplate 89 which is journaled to slide upon the motor mount guide rods 54 55. An air motor 90 is mounted upon the slideplate 89 and powers a circular knife blade 91 which is located in a plane just below that of the sensor engaging fingers 58, 59. Upon actuation of the first trip valve 76 the upper movement of the lower subframe 31 will be halted, by terminating the flow of fluid to cylinder 32, and almost immediately the reciprocable dogs 78, 79 will be withdrawn rearwardly along the sensor engaging fingers 58, 59, which were previously converged, to compress the carcass neck against the forward rim 51. Whereupon, also initiated in timed sequence by the first trip valve 76, the air motor 90 will be connected with a source of air under pressure, not shown, to power the circular knife blade 91 and the third actuating cylinder 86 will be subsequently connected to advance the slideplate 89 forwardly so as to advance the circular knife blade 91 to a point just short of the ends of dogs 78, 79 so as to only partially sever the carcass neck at a point just beneath the sensor engaging fingers 58, 59.

Figure 1:
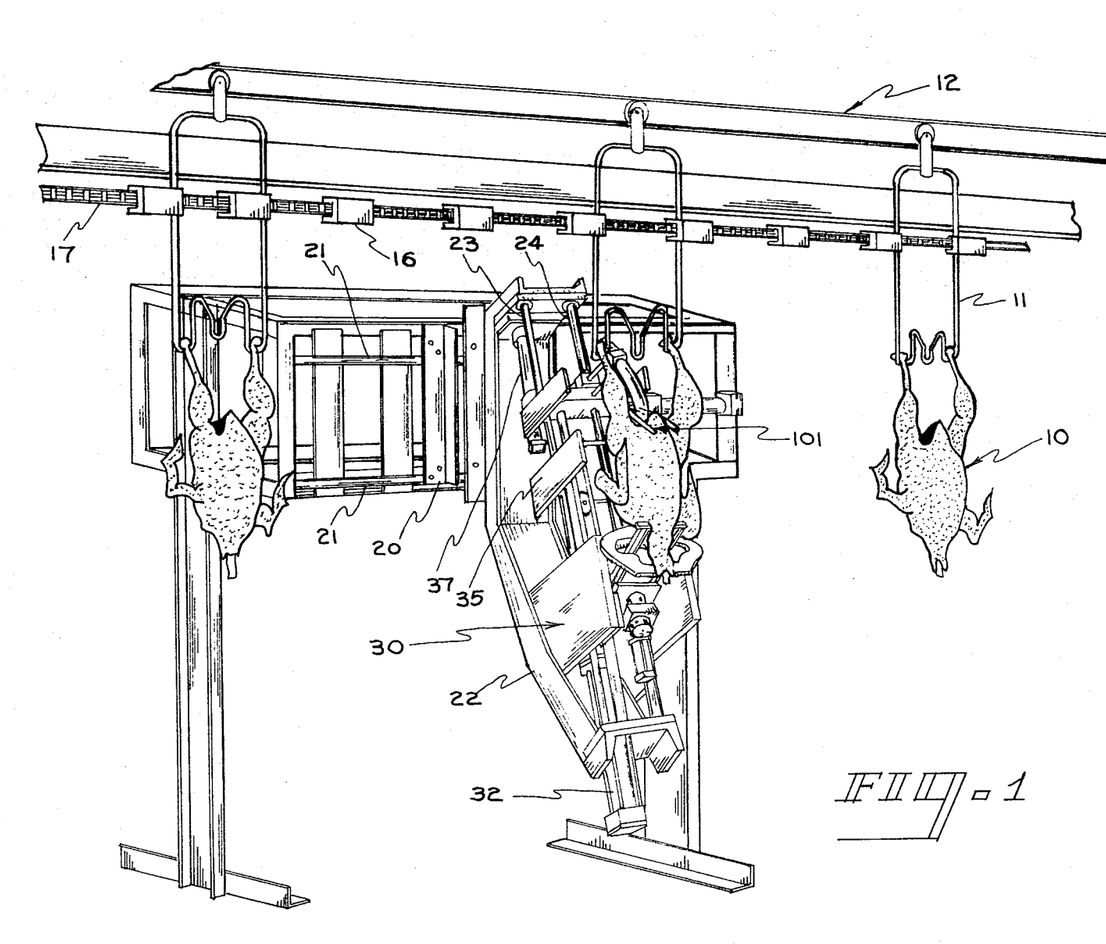
FIG. 1 is an overall perspective view of a preferred embodiment of the invention.
Figure 2:
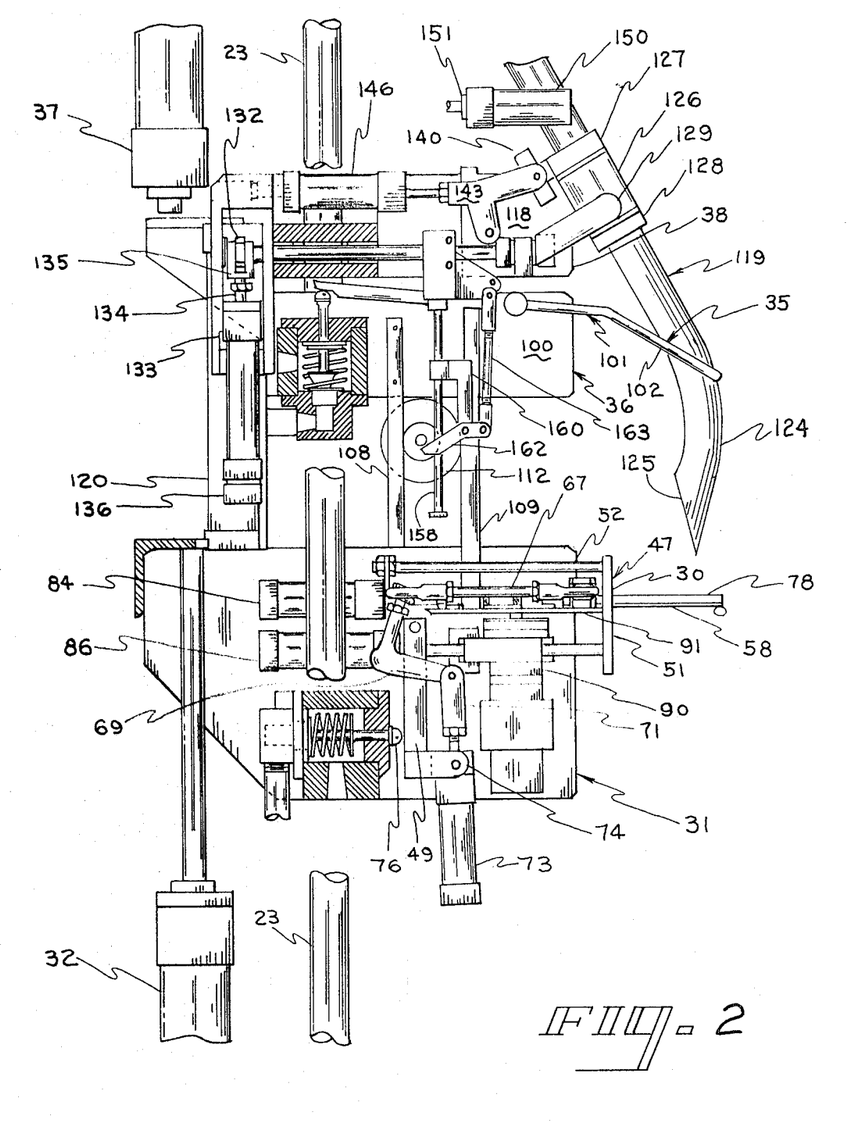
FIG. 2 is a side elevation, with certain parts removed for clarity, of a portion of the apparatus shown in FIG. 1.
Figure 6:
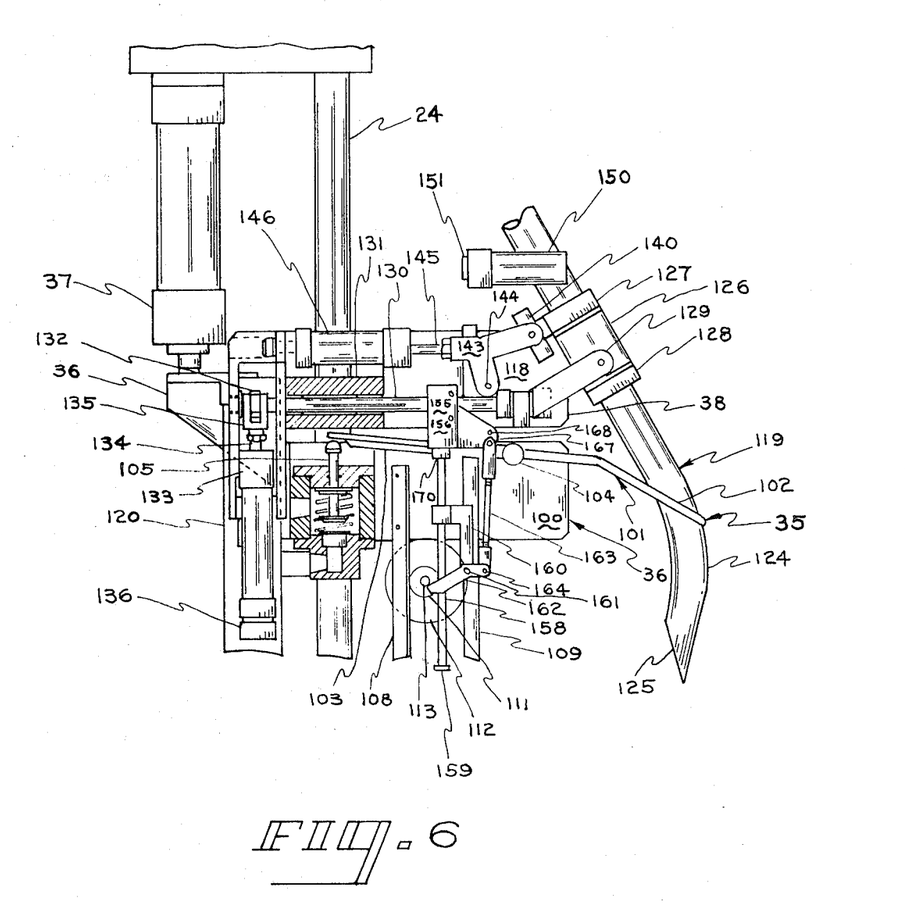
FIG. 6 is a detailed side elevation of the upper portion of the apparatus shown in FIG. 2.

Substantially simultaneous with the operation of the lower sensing and positioning means generally 30, the upper sensing and positioning means generally 35 is also operated, although it is preferred that the latter be actuated first so as to engage the carcass 10 and gently press it downwardly to hold it upon the shackle 11. The power cylinder 37 will first cause the entire assembly, including both first upper subframe 36 and second upper subframe 38, to be lowered together toward the posterior portion of a poultry carcass. The first upper subframe 36 is journaled, similarly to the lower subframe 31, to slide upon the inclined rods 23, 24, and carries a pair of frame side-plates 100. Pivotally mounted between the sideplates 100 is a sensor engaging fork generally 101 positioned to contact the posterior of the carcass 10 suspended from a shackle generally 11. The sensor engaging fork comprises a pair of forwardly extending times 102 which extend between the legs of the carcass, and a stem 103 extending rearwardly from the times 102 and fixed to a pivotable rocker shaft 104, the ends of which are journaled in the sideplates 100. The free, rear, end of the stem 103 rides upon a second trip valve or trip switch 105 which is also secured to the first upper subframe 36 between the sideplates 100. When the assembly has descended to the point at which the tines 102 contact the posterior of a carcass 10 the sensor engaging fork generally 101 will be pivoted sufficiently to actuate the second trip valve 105 to terminate movement of the power cylinder 37 and stop the first upper subframe 36, and the second upper subframe 38, carried thereby. Preferably at this time, when the carcass is thus held against upward displacement, the lower sensing and positioning means generally 30 is initiated by energizing the lower power cylinder 32 to lift the lower subframe 31 as previously described. Thus when the sensor engaging fingers 58, 59 contact the carcass shoulders the carcass will not be lifted. Trip valve 105 may be connected to initiate the lower power cylinder 32. Also in a modification of the apparatus the upper and lower subframes may be reciprocably mounted directly to one another.

The upper and lower sensing and positioning means, 35, 30, respectively, thus are movable to establish the size of a carcass to be operated upon. The overall apparatus is sized to accommodate between the sensing fingers 58, 59 and the tines 102 a carcass of the largest anticipated dimension. In the operation to be subsequently explained it may be desired to cyclically raise and lower a tool a distance dependent upon the size of the bird and more specifically related to the approximate location of the kidney of the carcass. Accordingly, means have been provided to mechanically approximate the level of the kidney between the lower sensing and positioning means generally 30 and the upper snesing and positioning means generally 35. This means to approximate includes a pair of rack gears 108 which are fastened to the sideplates 100 and depend below the first upper subframe 36. A second pair of rack gears 109 are spaced opposite the first pair 108 and are secured to the sideplates 41, 42 of the lower subframe 31 and extend upwardly therefrom. Meshed with the respective racks 108, 109, and mounted for free rotation by those pairs of rack gears are pairs of coupled spur gears including a minor spur gear 111 and major spur gear 112. The minor spur gears 111 mesh with the respective rack gears 108; and the major spur gears 112 mesh with the respective rack gears 109. Each pair of coupled gears are secured to opposite ends of a gear shaft 113 which serves as a trip mechanism to be later explained. It will thus be understood that movement of the lower subframe 31 and/or the first upper subframe 36 will induce some relative vertical movement of the gear shaft 113 due to the rotation imparted to the spur gears 111, 112. Relatively larger movement of the lower sensing and positioning means generally 30 induces comparatively small movement vertically of the gear shaft 113 as compared with movement imparted by the upper sensing and positioning means generally 35. Generally the gears and gear shaft 113 are initially set when the apparatus is assembled at a position approximately one-third the distance from the first upper subframe 36 to the lower subframe 31 (this has been determined to be the approximate position of the kidney of a carcass sized between the assemblies).

The aforementioned second upper subframe 38 is similarly journaled to reciprocate upon the rods 23, 24 and similarly supports a pair of frame sideplates 118. The aforementioned tool, comprising a vacuum horn generally 119, is supported from the frame sideplates 118 as is subsequently further explained. Also, a power cylinder 120 which is mounted on the rear face of the first upper subframe 36 is connected to raise and lower the second upper subframe 38 with respect to the former.

The vacuum horn generally 119 comprises a curved horn or vacuum tube 124 ending at the lower extremity as a biased nozzle face 125. The horn tube 124 is rotatably supported in a collar 126 that is captive between upper and lower lock rings 127, 128 which are fixed to the horn tube 124. The collar 126 is, in turn, pivotally mounted in a yoke 129 which is fastened to the end of a turn shaft 130 horizontally supported in a bearing block 131 mounted between the frame sideplates 118.

The turn shaft 130 is rotatable in the bearing block 131 by means of a crank arm 132 fixed to the shaft behind the second upper subframe 38. An actuating cylinder 133 is connected to the crank arm 132 by means of a piston rod 134 and clevis 135; and the actuating cylinder 133 is, in turn, connected to the piston rod of a secondary actuating cylinder 136 mounted parallel thereto. The tandem and serial arrangement of the actuating cylinders 133, 136 allows for a relatively lengthy throw of the crank arm 132 while the actuating means are kept to a relatively smaller vertical dimension. This arrangement also permits accurate control of side to side movement of the vacuum horn 119 between right side, center, and left side positions (i.e. when both piston rods are retracted the horn 119 will be fully left, with one rod extended the horn 119 will be centered, and with both rods extended the horn 119 will be fully right). In this arrangement only the secondary actuating cylinder 136 is secured to the second upper subframe 38.

The aforesaid elements supporting the vacuum horn 119, generally, thus provide for positively moving the nozzle face 125 sideways with respect to a carcass 10 supported in a shackle 11. Means are also provided for positively moving the nozzle face 125 forward and backward. This is accomplished by loosely securing the upper lock ring 127 to a three-axis universal joint 140 which is, in turn, held in a bifurcated rocker arm 143 that is pivotally mounted on a rocker pin 144 extending between the sideplates 118. The rear end of the rocker arm 143 is attached to an actuating rod 145 of an actuating cylinder 146 mounted horizontally on the second upper subframe 38. Thus, the bifurcated rocker arm 143 may be pivoted to transmit forward and rearward motion to the vacuum horn generally 119 with respect to its pivotal mounting in the yoke 129. Since the horn tube 124 is rotatable in the collar 126, and since the lock ring 127 is held in a universal joint 140 and is thereby pivotable with respect to 3 axes the horn tube 124 may swivel and rotate as it is turned from side to side. It is intended that once the carcass 10 is held by the tines 102 of the sensor engaging fork generally 111 the lower end of the vacuum horn generally 119 will be moved forwardly and thence lowered through an opening cut in the posterior of the carcass (the carcasses normally being previously partially eviscerated) until the nozzle face 125 reaches the shoulder and extremity of the body cavity. Thereafter the vacuum horn generally 119 is pivoted to bring the nozzle face rearwardly into contact with the inner surface of the body cavity, and a source of vacuum (not shown) is connected to the horn tube 124 while the latter is pivoted from side to side and, if desired, raised and lowered within the cavity to cleanse same. Since the horn tube 124 can rotate and swivel during this time the effect of vacuum will be to hold the nozzle face 125 close to the contour of the body cavity and thereby be confined sufficiently to carry away debris.

Communication with a source of vacuum (not shown) is regulated by a vacuum cutoff valve 150 built onto the horn tube 124 a short distance above the upper lock ring 127. The valve 150 is moved between open and closed positions by being connected to the end of a piston rod 151 of a small actuating cylinder (hidden from view in the drawings) mounted adjacent and parallel to the valve body.

Movement of the vacuum horn generally 119 and operation of the valve 150 are at least partly controlled by third and fourth trip valves or trip switches 155, 156 mounted between the frame sideplates 118 of the second upper subframe 38 so as to be triggered in unison by a single control rod 158. The control rod 158 extends downwardly and terminates as a foot 159 which may engage a stop member on the lower subframe 31. The third trip valve 155 is connected to reversibly actuate the power cylinder 120 which will in turn move the second upper subframe 38 with respect to the first upper subframe 36. Should the second upper subframe be lowered to the point that the foot 159 contacts the lower subframe 31, the control rod 158 will lift slightly and actuate the third and fourth trip valves 155 and 156, to a first condition causing the power cylinder 120 to raise the second upper subframe 38 from the first upper subframe 36, thus limiting the lowermost position of the nozzle face 125.

A horizontally displaceable bracket 160 is also vertically secured to the control rod 158 and carries a pivot pin 161 at a distance normally below the subframe 36. A toggle member 162 is pivotally mounted on the pivot pin 161 and one end thereof is held captive at the lower end of a fixed length rod 163 by a pin 164 thereon. The opposite end of the toggle member 162 extends toward the projected centerline path of the gear shaft 113; and the control rod 158 is located proximate and parallel the pairs of rack gears 108, 109 so that the free end of the toggle 162 may be held in a position to contact the gear shaft 113.

The relative position of the free end of toggle 162 with respect to the position of gear shaft 113 is adjustable by hanging the upper end of the fixed length rod 163 from either of a first hanger pin 167 and an alternate hanger pin 168, both of which are mounted adjacent the pair of trip valves 155, 156. The first hanger pin 167 is mounted lower than the alternate 168 and when the fixed length rod 163 is suspended from the first hanger pin 167 the free end of the toggle 162 will be extended to the point that it will be contacted by the gear shaft 113 upon upward movement of the second upper subframe 38 and the control rod 158. On the initial downstroke the free end of toggle 162 will override and pass the gear shaft 113 until the foot 159 is halted, at which time the toggle 162 pivots slightly on pin 164 so as to swing under the gear shaft 113. At the latter time trip valve 155 reverses the power cylinder 120 to move the subframe 38 upwardly. When this occurs the toggle will contact the gear shaft 113 and tend to be rotated oppositely about the pin 164 at the lower end of the fixed length rod 163 and will tend to pull downwardly on the bracket 160 and control rod 158 to reversibly trip valves 155 and 156 to a second condition causing downward movement of the subframe 38 and vacuum horn 124. The second upper subframe 38 may descend until either the foot 159 of the control rod 158 strikes the lower subframe 31 or until a lug 170 fastened to the upper portion of rod 158 strikes the top of the first upper subframe which will cause rod 158 to be displaced upwardly at which time both trip valves 155 and 156 will be reversed to the aforementioned first condition causing the second upper subframe 38 and horn 124 to be raised.

During the aforedescribed upstroke and downstroke the trip valve 156 operates both the actuating cylinder 146, connected to pivot the horn tube 124, and the actuating cylinder (not shown) connected to the vacuum cutoff valve 150 so as to open the valve 150, and connect the horn tube 124 to the source of vacuum, on each upstroke, and to close the valve 150 on each downstroke. The up and down cycling will continue until a timer (not shown) overcomes trip valve 155 and causes the power cylinder 120 to continue an upstroke to the upper limit of movement, and this will force the toggle 162 to override the shaft 113 and the horn tube will be raised fully and out of the carcass.

The cycling of the horn tube 124 may be avoided by hanging the rod 163 from the alternate pin 168. In this position the toggle 162 will be pivoted on pin 161 to an altitude where it will completely clear the shaft 113 and the rod 158 will not be pulled downwardly to reversibly trip valves 155 and 156. Hence the second upper subframe 38 will be raised to its upper limit after the first downstroke.

The operation of the aforedescribed apparatus thus begins when it is aligned with a carcass 10 and moving in the same direction. An operator may cause the power cylinder 37 to be operated to lower the upper subframe 36 and bring the sensor engaging fork 101 into engagement with the stern of the carcass. Thereafter the power cylinder 32 may be actuated to move the respective lower subframe 31 upwardly and the first actuating cylinder 73 operated to converge the sensor engaging fingers 58, 59 so as to engage the neck and shoulders of the carcass. These movements are automatically stopped when the tines 102 of the sensor engaging fork 101 contact the stern of the carcass and cause the second trip valve 105 to be actuated (terminating action of cylinder 37 and movement of the first upper subframe 36). And when the sensor engaging fingers 58, 59 contact the shoulders of the carcass and cause the first trip valve 76 to be actuated (terminating action of cylinder 32 and movement of the lower subframe 31). Subsequently, when the processing of the carcass is completed the apparatus is disengaged therefrom by reversing the movement of cylinders 32 and 37, which may also be accomplished manually by an operator.

While the carcass is engaged the operatOr may then cause the second actuating cylinder 84 to retract the reciprocable dogs 78, 79, so as to firmly hold the carcass neck against the forward rim 51, and then cause the third actuating cylinder 86 to advance the knife blade 91, so as to partially sever the neck. If the air motor 90 for the knife is not continuously operated it also would be energized at about this time. Subsequently, and preferably just before the power cylinder 32 is reversed, the first, second and third actuating cylinders 73, 84 and 86, are reversed to return to the starting condition and release the carcass and withdraw the knife 91.

Also while the carcass is engaged, and preferably simultaneous with the neck cutting operation the vacuum horn 124 is cyclically operated as earlier described. The upper subframes 36, 38 are first lowered with the piston rod 145 of actuating cylinder 146 retracted so that the nozzle face 125 is held forward and the nozzle will thereby be inserted into the body cavity of the carcass 10. Upon the upper subframes 36, 38 reaching their lowermost positions (respecting the engaged bird) the vacuum horn 124 is raised by actuating trip valve 155 to its first condition thereby causing the power cylinder 120 to lift the second upper subframe 38 with respect to the first upper subframe 36. This can be either automatic or it can also be initiated by an operator.

Trip valve 156 is actuated simultaneously with trip valve 155, and the former controls actuating cylinder 146 and the actuating cylinder (not shown) connected to operate the vacuum valve 150. In the first condition, where trip valve 155 causes upward motion of the subframe 38 and horn 124, trip valve 156 causes cylinder 146 to extend the piston rod 145 and pivot the horn 124 rearwardly to bring the nozzle face 125 into contact with the back side of the poultry carcass cavity. Simultaneously the vacuum valve 150 is caused to be opened and debris will thereby be cleared from the cavity during the upstroke of the horn 124.

Additionally trip valve 156 may initiate the actuating cylinder 133 and secondary actuating cylinder 136 to rock the shaft 130 and horn 124 from side to side during the upstroke.

Upon the second upper subframe 38 reaching a point that the gear shaft 113 trips toggle 162 and causes a repositioning of trip valves 155, 156 to the second condition the power cylinder 120 will be shifted to move the subframe downwardly, the actuating cylinder 146 will be reversed to pivot horn 124 away from the body cavity surface, and the vacuum valve will be closed.

Once the foregoing cycle has been repeated sufficiently to clean the body cavity of the carcass (which in practice is limited by the time required for horizontal travel of the movable frame means generally 20 as it travels with the carcass 10 and shackle 11 on conveyor 12), the trip valves 155 and 156 are overridden by a timer or by the operator to permit full upward movement of the second upper subframe 38 and the vacuum horn 119, during which movement the nozzle face 125 may be held against the back of the body cavity and the vacuum continued so as to cleanse the full upward limit of the body cavity. To permit overriding of the toggle 162 with respect to the gear shaft 113 the bracket 160 secured to control shaft 158 is mounted to be displaceable a short distance horizontally so that the free end of toggle 162 may ride like a cam over the gear shaft 113.

It will be apparent to those skilled in the art that the appratus described may be operated in the above described manner by either direct mannual manipulation of the various valves and power and actuating cylinder, or a suitable control circuit may be provided.

Operation of the device is terminated and a carcass 10 is released by reversing both major power cylinders 32 and 37 so as to withdraw, respectively, the lower subframe 31 and both upper subframes 36 and 38. Immediately thereafter the movable frame means generally 20 is quickly reversed so as to return on horizontal tracks 21 to the initial starting position where a successive carcass on a successive shackle will be confronted and the entire operation recommenced.

Obviously many modifications and variations of the invention as hereinbefore set forth may be made without departing from the spirit and scope thereof, and, therefore, only such limitations should be imposed as are indicated in the appended claims.

I claim:

1. An improved method for processing a partially eviscerated poultry carcass, said method comprising: holding the carcass suspended by the legs from a shackle with the neck extending downwardly; engaging the stern and neck of the carcass against displacement; cutting the neck at a point below said shoulders; lowering a vacuum nozzle into the body cavity of the carcass through an incision in the stern thereof; and reciprocating the nozzle within said cavity to clear the cavity of debris while the carcass is thus suspended and engaged.

2. The method of claim 1 wherein the position of the carcass stern and shoulders are first detected and the vacuum nozzle and means for severing are positioned in accordance therewith.

3. The method of claim 1 wherein the carcass is being continuously moved along a path.

4. The method of claim 1 wherein the vacuum nozzle is lowered substantially simultaneously with the engaging and cutting of the neck.

5. The method of claim 1 wherein the neck is engaged at a location closely adjacent the carcass shoulders and is cut immediately below said location.

6. The method of claim 1 including a step of estimating the approximate position of a selected anatomical feature of the carcass and wherein the nozzle is cyclically reciprocated with respect to said feature.

7. The method of claim 1 wherein a vacuum is applied through said nozzle during upward movement thereof and the nozzle is rotated from side to side.

8. An improved apparatus for processing a partially eviscerated poultry carcass suspended from shackle means by the legs with the neck thereof extending downwardly, said apparatus comprising: means for engaging the stern and neck of the carcass against displacement; means for cutting the neck of the carcass at a point adjacent the engaging means; a vacuum nozzle mounted for reciprocal movement with respect to the suspended carcass and into the body cavity thereof; and means to raise and lower said vacuum nozzle with respect to the carcass.

9. The apparatus of claim 8 including sensor means movable to detect the position of the carcass shoulders and stern, said sensor means being connected to position said vacuum nozzle and said means for cutting the neck.

10. The apparatus of claim 9 including proportioning means connected between said sensor means for approximating the relative position of a selected anatomical feature of the carcass, and control means for cyclically reciprocating said vacuum nozzle with respect to said proportioning means.

11. The apparatus of claim 8 including actuating means to pivot and rotate said nozzle and valve means to control the vacuum to said nozzle.

12. The apparatus of claim 9 wherein the means for engaging the neck of the carcass is carried on the sensor means movable to detect the position of the carcass shoulders.

* * * * *